March 11, 1969     R. CASHMAN ET AL     3,432,214

MOUNTING PIN ASSEMBLY

Filed Aug. 15, 1966

INVENTORS
ROBERT W. CASHMAN
ANTHONY WASCO, JR.
BY
Learman & McCulloch
ATTORNEYS

United States Patent Office 3,432,214
Patented Mar. 11, 1969

3,432,214
MOUNTING PIN ASSEMBLY
Robert Cashman and Anthony Wasco, Jr., Saginaw, Mich., assignors to Saginaw Machine and Tool Company, Saginaw, Mich., a corporation of Michigan
Filed Aug. 15, 1966, Ser. No. 572,541
U.S. Cl. 308—15                             5 Claims
Int. Cl. F16c *11/00;* F16b *35/00, 39/00*

ABSTRACT OF THE DISCLOSURE

An expansible and contractile pivot assembly has a cylindrical, longitudinally bored body having conical recesses at its opposite ends. The body is slotted axially adjacent each of its ends to provide resilient segments or fingers which may be expanded and contracted radially. In each recess is a conical thrust member, each of which is axially bored. The bore of one thrust member is smooth and the bore of the other thrust member is threaded. A bolt having a head at one end interconnects the thrust members, the head seating on the smooth bore thrust member and the other end of the bolt being threaded and in threaded engagement with the bore of the other thrust member. The thrust member in threaded engagement with the bolt carries a radially projecting pin which extends into a slot at the adjacent end of the cylindrical body to prevent relative rotation while permitting relative axial movement of that thrust member and the body. Rotation of the bolt in one direction effects movement of first one and then the other thrust member toward one another to effect expansion of the segments at opposite ends of the body member.

---

This invention relates to a mounting pin assembly and more particularly to a mounting pin construction which enables the pin to be accommodated in openings formed in a plurality of members in such a manner as to enable the longitudinal axis of the pin to coincide with the longitudinal axis of at least one of the openings even though none of the openings is of exactly the same size, and even though the openings themselves are not truly coaxial.

In the construction of machinery it frequently is necessary to span a space between two or more members with a pin, shaft, spindle or the like on which may be pivoted or journaled one or more parts for rotation about the axis of the pin, shaft or spindle. Unless the openings in the parts in which the pin is mounted are truly coaxial and the same size, the axis of the pin about which the rotatable part rotates will not be coaxial with the axis of the openings in which the pin is accommodated, and the resultant rotation of the rotatable member will be in a plane other than that desired. In some instances, small deviations in the axis or plane of rotation of a part are not critical, but in the construction of precision machinery required to maintain extremely close tolerances, even such small deviations can be greatly detrimental.

Analysis of the problems of maintaining a coaxial relationship between the axis of rotation of a shaft and the axis of the shaft mounting members has revealed that it is virtually impossible to provide two or more bores or openings in two or more members and which are truly equal in size and truly coaxial. Thus, in practice, it is not possible to drill two coaxial bores of exactly the same size in the spaced apart arms of a yoke, for example. Consequently, a shaft or pivot pin fitted in the two bores more than likely will have its longitudinal axis canted to some degree to the intended axis. If a roller or other member is to be mounted on such a pin or shaft, the roller or other member also must have an opening therein. Such opening also more than likely will differ in size from the size of the other openings referred to and, in addition, it is the rule rather than the exception that the axis of the opening in the roller or other rotatable member will not be coincident with the axes of the other openings. Consequently, the axis about which the roller or other member rotates cannot be an axis that is coincident with the geometric axis of the openings in all three members, and the rotatable member will rotate about an axis which may differ from its geometric axis.

An object of this invention is to provide a pin or shaft assembly which is capable of overcoming the problems referred to above.

Another object of the invention is to provide a pin or shaft assembly in which the axis of rotation of a member mounted on the pin or shaft coincides with the axis of the opening in the member that is to be rotated.

A further object of the invention is to provide an adjustable pin assembly for accommodation in an opening formed in a rotatable member and wherein the coincidence of the axis of the pin and the axis of the rotatable member may be assured regardless of the usual variations in sizes and axes of openings formed in plural members.

Another object of the invention is to provide an assembly of the character indicated and in which uniformity of mounting forces at different zones along the shaft or pin may be maintained.

Other objects and advantages of the invention will be pointed out specifically, or will become apparent from the following description when it is considered in conjunction with the appended claims and the accompanying drawings, in which:

Figure 1:
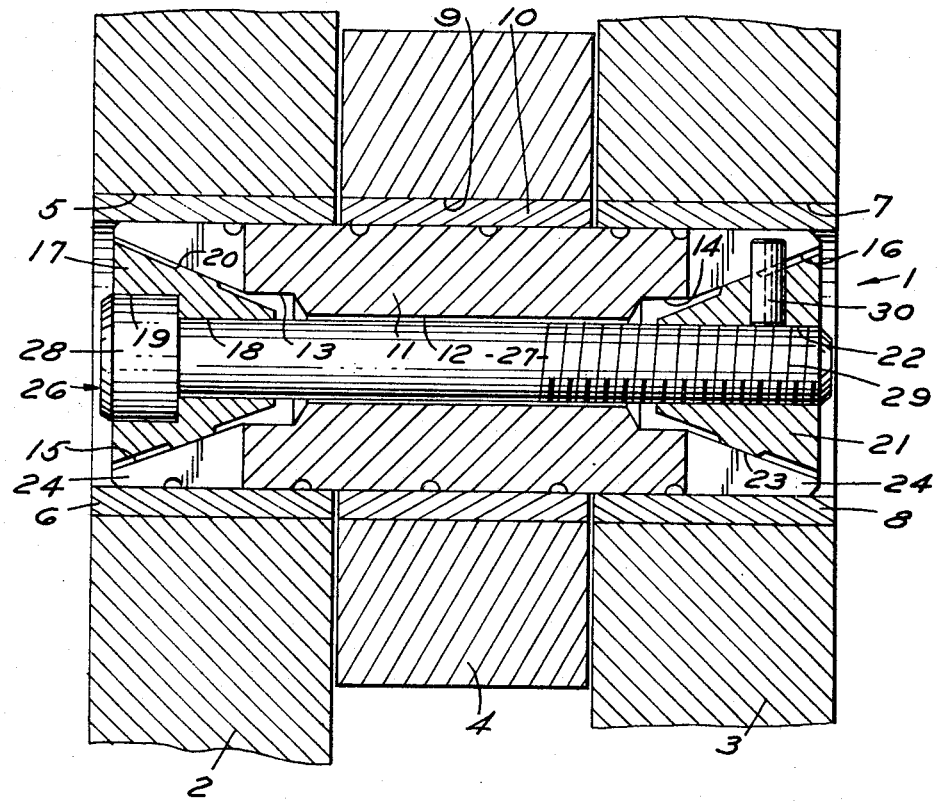
FIGURE 1 is a vertical sectional view, illustrating a rotatable member sandwiched between two stationary members and mounted for rotation relative to the fixed members by mounting apparatus constructed in accordance with the invention.
Figures 2, 3:
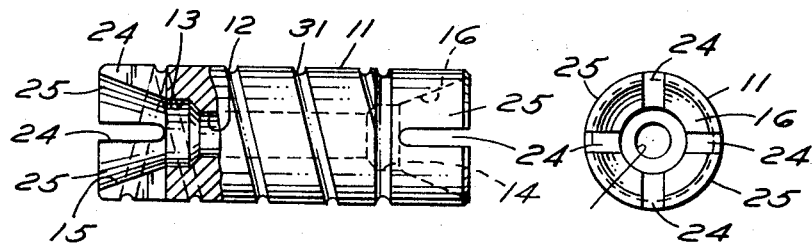
FIGURE 2 is a reduced scale view, partly in elevation and partly in section, of a portion of the mounting apparatus shown in FIGURE 1.
FIGURE 3 is an end elevational view of the apparatus shown in FIGURE 2.

Apparatus constructed in accordance with the invention is adapted for use in conjunction with the mounting of relatively rotatable members and, as disclosed in FIGURE 1, the apparatus comprises a mounting pin assembly 1 which spans the space between a pair of fixed, spaced apart members 2 and 3, between which is a rotatable member 4. The members 2 and 3 may be the parallel legs of a yoke, parallel fixed support members, or any other two members, and the member 4 may be a roller, one end of a link, a lever, or other relatively movable part. Alternatively, the member 4 may be fixed and the members 2 and 3 may be rotatable or oscillatable relative to the member 4.

The member 2 has a cylindrical opening 5 formed therein, and which may or may not be provided on its inner periphery with a bearing 6. The member 3 has a similar opening 7 therein, and may or may not be provided with a similar bearing 8. The member 4 also is provided with a cylindrical opening 9 and it, too, may or may not be provided with a bearing 10. The presence or absence of the bearings in the respective members will depend upon whether the assembly 1 is to be rotatable or fixed relative to the members 2, 3 or 4.

The openings 5, 7 and 9 may be formed by conventional boring or drilling processes so that their sizes and geometric axes correspond as closely as possible to each other. Inevitably, however, there will be some variation in size, in the location of the respective axes, or both. The assembly 1, however, is adapted to compensate for such variations.

The pin assembly 1 comprises a cylindrical body 11, having an axially extending bore 12 therein terminating at its opposite ends in counterbores 13 and 14. The counterbore 13 terminates in an outwardly diverging, frustoconical, recess 15 and the counterbore 14 terminates in a similar recess 16. Adapted for removable accommodation in the recess 15 is a frustoconical thrust member 17 having an axial bore 18 terminating at its outer end in a counterbore 19. The degree of taper of the periphery of the member 17 corresponds substantially to that of the recess 15, and the thrust member 17 preferably is provided with an annular wear surface 20 that is adapted to bear against the surfaces of the recess 15.

Adapted for removable accommodation in the recess 16 is a frustoconical thrust member 21 having an axial, threaded bore 22 extending therethrough. The degree of taper of the member 21 corresponds to that of the recess 16 and the member 21 has an annular wear surface 23 on its periphery adapted to engage the surface of the recess 16.

Each end of the body 11 is provided with circumferentially spaced radial slots of notches 24, which provide a plurality of segments or fingers 25 at each of the body 11. The axial length of each slot 24 preferably corresponds to the axial length of the tapered portion of the associated recess 15 and 16. The material from which the member 11 is formed preferably is steel having sufficient inherent resilience to enable the fingers 25 to be radially displaced. That is, the fingers 25 should be movable radially from a normal position upon the application of force and should be capable of returning to the normal position upon the relaxation of the force.

A force applying and transmitting bolt 26 interconnects the thrust numbers 17 and 21 and comprises a shank 27 of such size to to pass freely through the bore 12 in the body 11. The bolt has a head 28 at one end accommodated in the counterbore 19 of the thrust member 17. The other end of the bolt shank 27 is threaded as at 29 to correspond to the threads of the bore 22 so as to be capable of being threaded into and out of the thrust member 21. To prevent relative rotation between the body 11 and the thrust member 21, the latter may be provided with a radially extending stop pin 30 which projects into one of the slots 24 and reacts with an adjacent segment 25.

In the ensuing description, it will be assumed that the members 2 and 3 constitute the legs of a yoke and that the member 4 constitutes a lever that is rotatable relatively to the yoke. Moreover, the presence or absence of bearings in the members 2, 3 and 4 will be disregarded, it being understood that when reference is made to such opening it is intended that the size thereof be that including or excluding the bearings as the case may be.

To assemble the apparatus 1 with the members 2, 3 and 4, the openings 5, 7 and 9 will be aligned as nearly as possible. The body 11, together with the members 17 and 21 and the member 26, but with members 17 and 21 exerting no radial thrust on the fingers 25, will be inserted in the openings of their respective members. In this connection, the outside diameter of the body 11 should be so selected as to fit very closely the inside diameter of the opening 9. The sizes of the openings 5 and 7 must be slightly greater than the size of the opening 9 so as to permit the body 11 to be accommodated in the members 2 and 3. The snug fit of the body 11, however, together with the slight over-size of the openings 5 and 7, will assure a truly coaxial relation between the opening 9 and the body 11.

When the body 11 is accommodated in all three openings, the bolt 26 may be rotated in such direction as to cause the thrust members 17 and 21 to be moved in opposite directions, i.e., toward each other, so as to wedge into the respective recesses and effect a radially outward thrust on the fingers 25. As the bolt is rotated, one or the other of the members 17 or 21 will move axially inwardly of the associated recess and wedge or expand the associated fingers 25 radially outwardly until they snugly engage the surface of the associated opening 5 or 7. Thereafter, continued rotation of the bolt 26 will cause the other thrust member 17 or 21 to move axially inwardly of its associated recess and expand or wedge radially the associated fingers 25. This process will be repeated until the fingers at both ends of the body are in snug engagement with the walls of the respective openings 5 and 7. Inasmuch as the thrust members 17 and 21 are adjusted relatively to the body 11 by means of a single bolt, neither thrust member can exert a greater force on the associated fingers 25 than does the other thrust member. Thus, the force exerted at each end of the member 11 on the respective members 2 and 3 will be uniform.

Even though the openings 5 and 7 may not be uniform in size, and even though the openings 5 and 7 may not be truly coaxial, these differences are compensated for inasmuch as the fingers 25 at either or both ends of the body 11 may be expanded until each engages the wall of the respective openings 5 and 7 with equal force. As a result, the axis of the member 11 remains coincident with the axis of the opening 9 and the member 4 rotates about that axis.

Should it be necessary or desirable to disassemble the members 2, 3 and 4, the member 26 may be rotated in a direction to relax the force on the thrust members 17 and 21, whereupon they may move away from each other, whereupon the fingers 25 will contract radially and enable separation of the assembly 1 from the members 2, 3 and 4.

In those instances where it is desirable to provide lubrication between the body 11 and the part in which it is accommodated, a lubricant groove 31 may be provided in its outer surface.

The disclosed embodiment is representative of a presently preferred form of the invention, but is intended to be illustrative rather than definitive thereof.

What is claimed is:

1. An expansible and contractile pin construction comprising a body member having a longitudinal bore therethrough terminating at its opposite ends in inwardly tapering, conical recesses, each end of said body member having a plurality of axially extending slots providing a plurality of circumferentially spaced resilient segments; a conical thrust member accommodated in each of said recesses and in engagement with the inner surfaces of said segments, one of said thrust members having a smooth bore therethrough and the other of said thrust members having a threaded bore therethrough; a force applying member rotatably accommodated in the bores of said thrust members and having a head at one end seated on said one of said thrust members and being threaded at its other end and in threaded engagement with the other of said thrust members; and stop means carried by said other of said thrust members and extending radially therefrom into a slot at the adjacent end of said body member for precluding relative rotation between said body member and said other of said thrust members while enabling relative axial movement thereof, relative rotation between said force applying member and said thrust members effecting axial movement of first one and then the other of said thrust members relative to said body member, whereby said segments may be radially expanded or contracted depending on the direction of rotation of said force applying member.

2. The construction set forth in claim 1 wherein said one of said thrust members has a counterbore communicating with its bore for the accommodation of said head of said force applying member.

3. The construction set forth in claim 1 wherein said body member has a lubricant accommodating groove in its outer surface.

4. The construction set forth claim 1 wherein said body member has a counterbore between each of said recesses and said longitudinal bore.

5. The construction set forth in claim 1 wherein each of said thrust members has a radially projecting, annular rib between its ends.

References Cited

UNITED STATES PATENTS

| | | | |
|---|---|---|---|
| 774,186 | 11/1904 | Ladd | 92—188 |
| 1,349,437 | 8/1920 | Royer | 85—67 |
| 1,943,364 | 1/1934 | Betz | 92—187 |
| 2,850,340 | 9/1958 | Brill | 92—187 |
| 2,937,666 | 5/1960 | Maisch | 85—67 X |
| 3,054,320 | 9/1962 | Dickow | 85—67 |
| 3,091,990 | 6/1963 | McVittie | 85—67 |

FOREIGN PATENTS 17,256    7/1907    Great Britain.

CARROLL B. DORITY, Jr., *Primary Examiner.*

U.S. Cl. X.R.

85—67; 287—100